US010327399B2

(12) United States Patent
Elazary et al.

(10) Patent No.: US 10,327,399 B2
(45) Date of Patent: Jun. 25, 2019

(54) HARVESTING ROBOTS FOR HYDROPONICS

(71) Applicant: inVia Robotics, Inc., Agoura Hills, CA (US)

(72) Inventors: Lior Elazary, Agoura Hills, CA (US); Randolph Charles Voorhies, Culver City, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 114 days.

(21) Appl. No.: 15/363,446

(22) Filed: Nov. 29, 2016

(65) Prior Publication Data

US 2018/0146618 A1    May 31, 2018

(51) Int. Cl.
*A01G 31/06* (2006.01)
*A01D 46/30* (2006.01)
*G05D 1/02* (2006.01)

(52) U.S. Cl.
CPC ............. *A01G 31/06* (2013.01); *A01D 46/30* (2013.01); *G05D 1/0246* (2013.01); *G05D 2201/0201* (2013.01); *Y02P 60/216* (2015.11)

(58) Field of Classification Search
CPC .... A01D 34/008; A01D 34/015; A01D 90/02; A01D 2101/00; A01G 31/06; G05D 1/0246; G05D 1/0274; G05D 2201/0201
See application file for complete search history.

(56) References Cited

U.S. PATENT DOCUMENTS

| | | | |
|---|---|---|---|
| 5,946,896 A * | 9/1999 | Daniels | A01D 46/264 56/328.1 |
| 9,120,622 B1 * | 9/2015 | Elazary | B66F 9/07 |
| 2016/0157429 A1 * | 6/2016 | Pitzer | A01D 46/30 701/23 |
| 2016/0205872 A1 * | 7/2016 | Chan | A01G 3/08 |
| 2016/0304281 A1 * | 10/2016 | Elazary | B66F 9/07 |

* cited by examiner

*Primary Examiner* — Thomas E Worden
(74) *Attorney, Agent, or Firm* — Ansari Katiraei LLP; Arman Katiraei; Sadiq Ansari

(57) ABSTRACT

Robots for autonomous harvesting of hydroponically grown organic matter with different harvesters are disclosed. The autonomous harvesting involves using one or more robots to (1) navigate a hydroponics arrangement or environment to arrive at locations of harvestable organic matter, (2) identify mature organic matter for harvesting from under-ripe or over-ripe organic matter using the robot's sensors, (3) identify the irregular positions and the irregular extraction points at which the mature organic matter is to be correctly harvested using the robot's sensors, (4) harvest the organic matter at the identified positions using the robot harvester, and (5) place the extracted organic matter into a storage bay for delivery to a packaging or shipment station. The harvester includes one or more of a vacuum, gripper, cutting saw, or clipping shears disposed about a distal end of an extendable or mechanical arm mounted atop a lift.

11 Claims, 13 Drawing Sheets

HARVESTING ROBOTS FOR HYDROPONICS

BACKGROUND INFORMATION

Hydroponics is an alternative to traditional farming. Hydroponics transitions farming from outdoor soil-based methodologies to an indoor or closed environment methodology. This transition provides several benefits and efficiencies including reduced or eliminated crop loss from insects or adverse weather, reduced water and fertilizer usage, and reduced land consumption as some factors. Hydroponics achieves these benefits and efficiencies by providing near complete control over the environmental factors affecting crop growth as well as what and how nutrients are fed to the crop.

The significant differences in these farming methodologies have also resulted in a fork in farming technology. Existing machinery developed to optimize and automate many traditional outdoor soil-based farming tasks are unusable for hydroponics. The existing machinery cannot be adapted or cannot operate in the confined space of a hydroponics environment. Consequently, many of the tasks that have long been automated or mechanized in traditional outdoor soil-based farming still involve manual or human labor in hydroponics.

One of the biggest disconnects in the technological fork between traditional outdoor soil-based farming and hydroponics is in harvesting. Traditional outdoor soil-based farming has long relied on tree shakers, harvesters, and other machinery to rapidly harvest organic matter from vines, plants, or trees. Hydroponics has no such equivalent. Hydroponics relies heavily, and almost exclusively, on human labor to harvest the hydroponically grown organic matter.

There is therefore a need to bridge the technological fork between traditional outdoor soil-based farming and hydroponics and incorporate more automation and mechanization for hydroponics. In particular, there is a need to automate and mechanize harvesting of organic matter from hydroponically grown vines, plants, or trees, whereby the automation and mechanization can execute within the indoor or closed confined farming environment of hydroponics.

BRIEF DESCRIPTION OF THE DRAWINGS

A preferred embodiment for hydroponics harvesting robots will now be described, by way of example only, with reference to the accompanying drawings in which.

DETAILED DESCRIPTION OF PREFERRED EMBODIMENTS

Harvesting organic matter grown with hydroponics is very different than harvesting organic matter grown with traditional outdoor soil-based farming. With traditional outdoor soil-based farming, the vines, plants, or trees are arranged in rows about a common plane, whereby the common plane is established by the shape of the earth in which the vines, plants, or trees grow or take root. With hydroponics, the vines, plants, or trees are arranged in rows within trays or pods, and the trays or pods are placed on different shelving of one or more racks. Each rack shelf can be located about a different vertical plane.

The multiple vertical planes allow hydroponics to grow more organic matter per square foot than is possible in traditional outdoor soil-based farming. The organic matter growth is even more condensed for hydroponics because hydroponics eliminates soil from the farming methodology. Hydroponics immerses vine, plant, or tree roots directly within a nutrient rich liquid or mist and with no or minimal soil. As a result, the roots can be confined to a very small space allowing the vines, plants, or trees to grow very closely next to one another. Such confinement and condensed planting is not possible with traditional outdoor soil-based farming as the roots grow and spread within the soil in order to seek out and extract the needed nutrients.

Hydroponics harvesting also differs from traditional harvesting. The minimal or no soil growth sometimes requires a more delicate harvesting than for vines, plants, or trees that are deeply root in soil so that future growth is not affected. In other cases, hydroponics harvesting involves altogether different techniques. For example, when the harvestable matter is grown from a pod, the entire pod can be removed during harvesting as opposed to pulling or shearing different stems or branches of the vine, plant, or tree.

Figure 1:
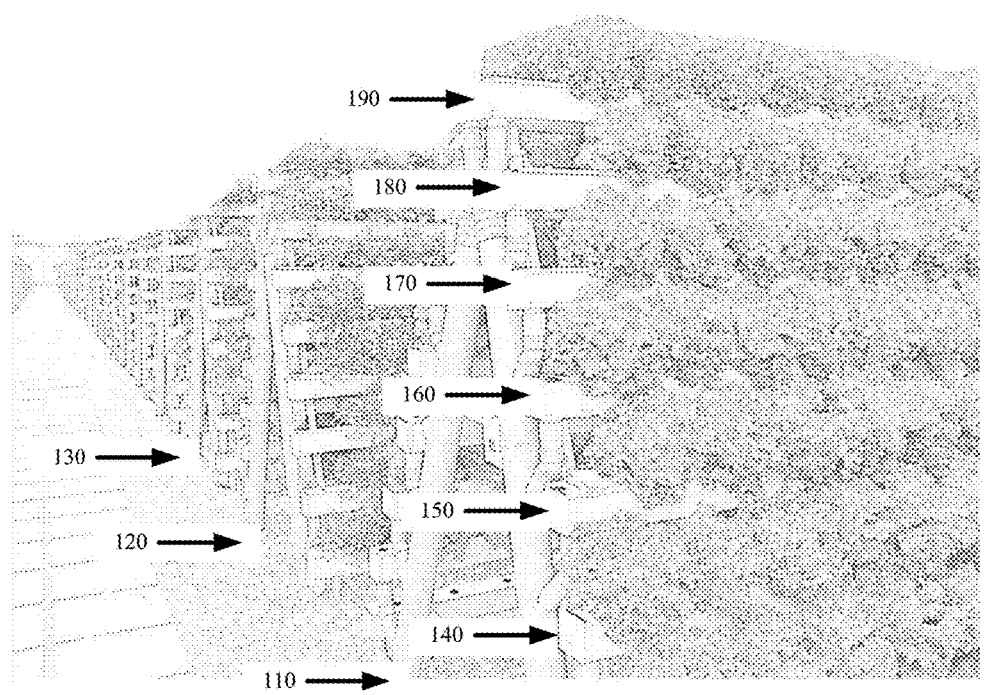
FIG. 1 illustrates an exemplary arrangement of hydroponically grown vines, plants, or trees in accordance some embodiments.

FIG. 1 illustrates an exemplary arrangement of hydroponically grown vines, plants, or trees in accordance some embodiments. The arrangement involves a horizontal and vertical placement of the vines, plants, or trees about different shelves of different racks. The racks are arranged in a set of rows 110, 120, and 130. Each rack contains one or more shelves at different vertical heights. For instance, rack 110 includes shelves 140, 150, 160, 170, 180, and 190 at ascending heights.

In this figure, there is some horizontal or staggered offset between ascending shelves of a rack. The horizontal offset provides each rack with additional vertical clearance for organic matter to grow upwards unobstructed. In other arrangements, the shelves can be located directly above one another.

In some embodiments, each shelf includes a set of pods or a tray with one or more apertures for suspending or otherwise containing the individual vines, plants, or trees. The pods or trays can also provide a separation barrier to keep the roots immersed in the nutrient rich liquid while the remainder of the vine, plant, or tree is kept dry or separated from the nutrient rich liquid.

Figure 2:
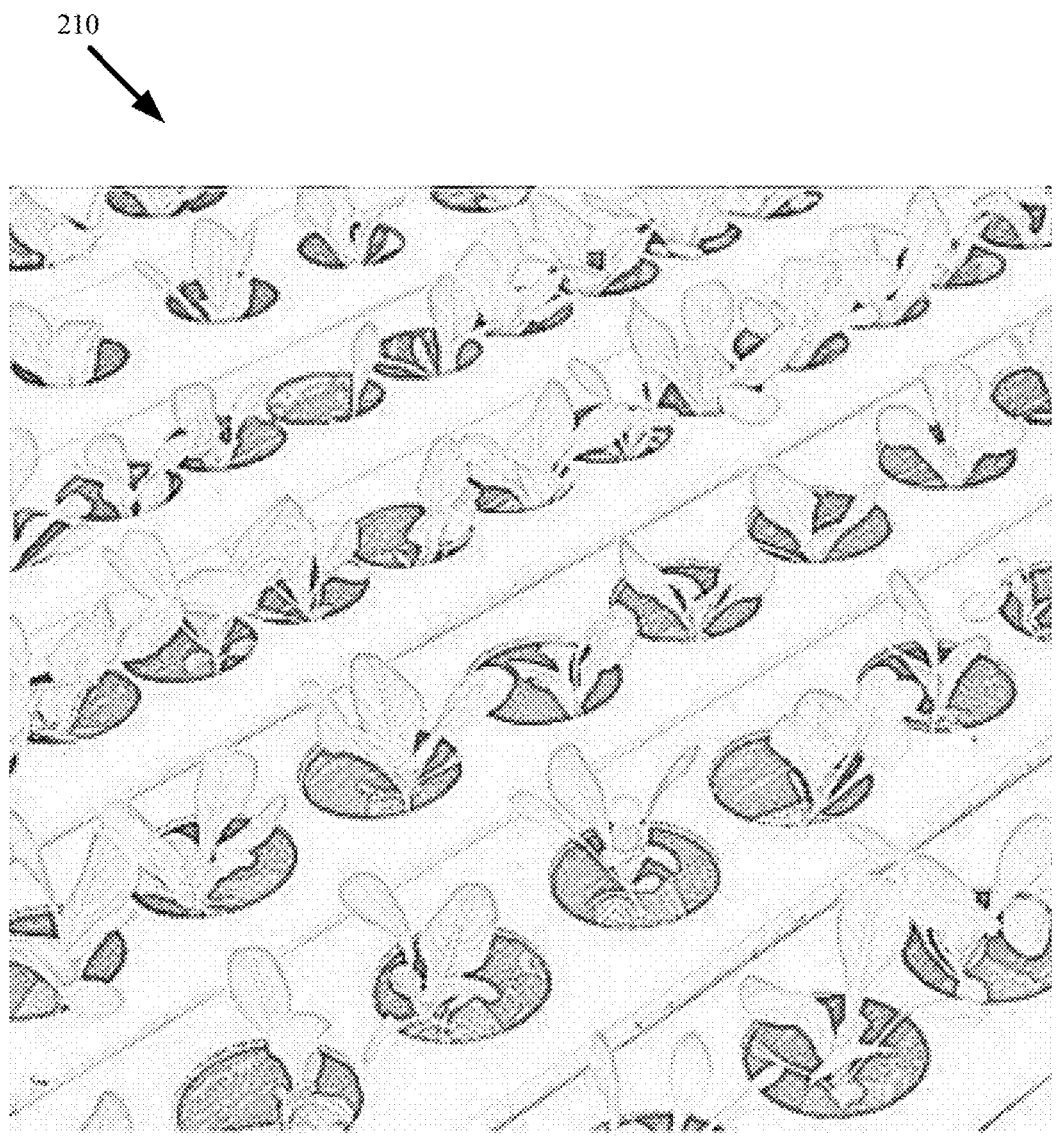
FIG. 2 illustrates a hydroponics cultivation tray in accordance with some embodiments.

FIG. 2 illustrates a hydroponics cultivation tray 210 in accordance with some embodiments. Several of these trays may be placed on the same or different shelves of a rack. Typically, a tray is used to grow the same vine, plant, or tree. Trays with different vines, plants, or trees may be placed on different shelves or different racks.

Although the figures depict upwards growth, hydroponics also allows for the vines, plants, or trees to be suspended for inverted growth. Some plants grow faster when inverted as the growth does not have to counter gravitational forces. For instance, tomato vines can be suspended and grow downwards, whereas lettuce or herbs prefer upwards growth.

In any hydroponics setup or environment, the growth of the vines, plants, or trees may place the harvestable organic matter in irregular positions with different organic matter having different extraction points for harvesting the organic matter. The irregular extraction points refer to different points at which organic matter is to be harvested from the base, stem, branch, or other locations about a vine, plant, or tree. In other words, the organic matter that is to be harvested will not be the same size and shape, will not grow on vines, plants, or trees that are the same size and shape as one another, and will therefore be in different positions about each arrangement. The same exact harvesting steps may therefore be inapplicable when extracting two different instances of the same organic matter.

The embodiments disclosed herein provide robots for autonomous harvesting of hydroponically grown organic matter, wherein the organic matter includes fruits, vegetables, plants, nuts, roots, and other edibles that grow on vines, plants, or trees. The autonomous harvesting of some embodiments involves the robots (1) navigating a hydroponics arrangement or environment to arrive at locations of harvestable organic matter, (2) identifying mature organic matter for harvesting from under-ripe or over-ripe organic matter, (3) identifying the irregular positions and the irregular extraction points at which the mature organic matter is to be correctly harvested, (4) harvesting the organic matter from the vine, plant, or tree at the identified positions, and (5) safely entering the organic matter into a repository for delivery to a packaging or shipment station.

Figure 3:
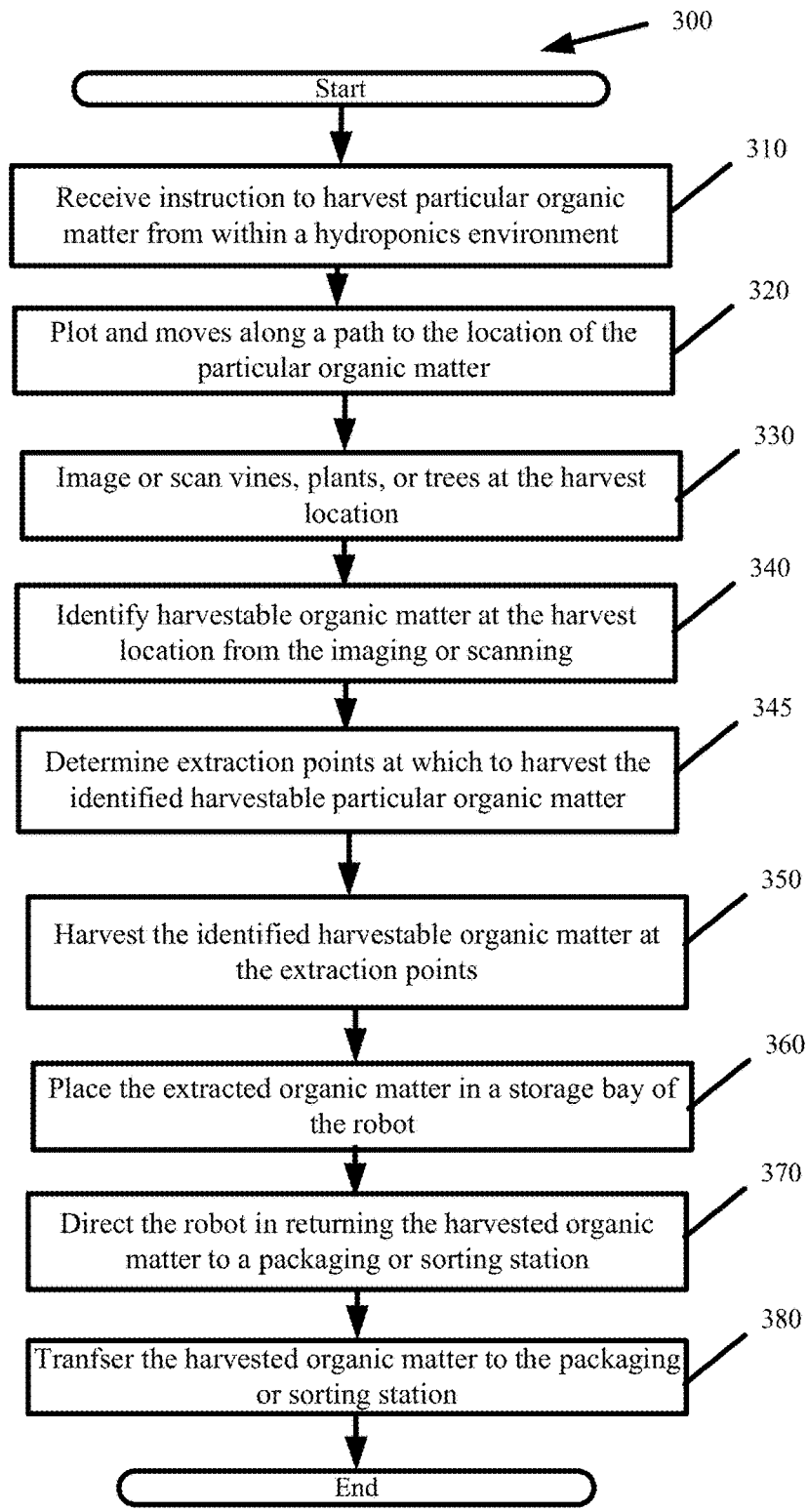
FIG. 3 presents a process for autonomous harvesting of hydroponically grown organic matter in accordance with some embodiments.

FIG. 3 presents a process 300 for autonomous harvesting of hydroponically grown organic matter in accordance with some embodiments. Process 300 is performed by a harvesting robot of some embodiments.

The process 300 commences with the robot receiving (at 310) instruction to harvest particular organic matter from within a hydroponics environment. The instruction identifies the particular organic matter. The identification can be in the form of a visual representation of the particular organic matter or one or more identifiers such as fiducials, barcodes, quick response (QR) codes, or other alphanumeric or symbolic representations found on or associated with the one or more racks, shelves, or trays on which the particular organic matter grows. In some embodiments, the instruction directs the robot to harvest a set quantity of the particular organic matter. In some other embodiments, the instruction directs the robot to harvest any quantity of the particular organic matter that is ripe, and optionally harvest and discard the particular organic matter that has spoiled or has not grown correctly.

The instruction provided to the harvesting robot can come from a central director or monitoring station that coordinates the operations of one or more harvesting robots. The instruction can also be generated internally by the robot in response to monitors throughout the hydroponics environment or regular (e.g., daily) programmatic activities performed by the robot. For instance, the robot may traverse the hydroponics environment on a daily or weekly basis in order to identify and harvest ripe organic matter detected by the robot during the traversal.

The process plots (at 320) and moves along a path to the harvest location. To do so, the robot determines its current location. The robot determines its current location from scanning a nearby location identifier, receiving location beacon information, by tracking its geolocation coordinates, or by using sensors to map or ascertain its position. The robot then identifies the destination at which the particular organic matter is to be harvested.

In some embodiments, the robot accesses a mapping of the hydroponics environment, wherein the mapping identifies locations of different organic matter about the hydroponics environment. The robot plots the path to the harvest location based on the mapping.

Figure 4:
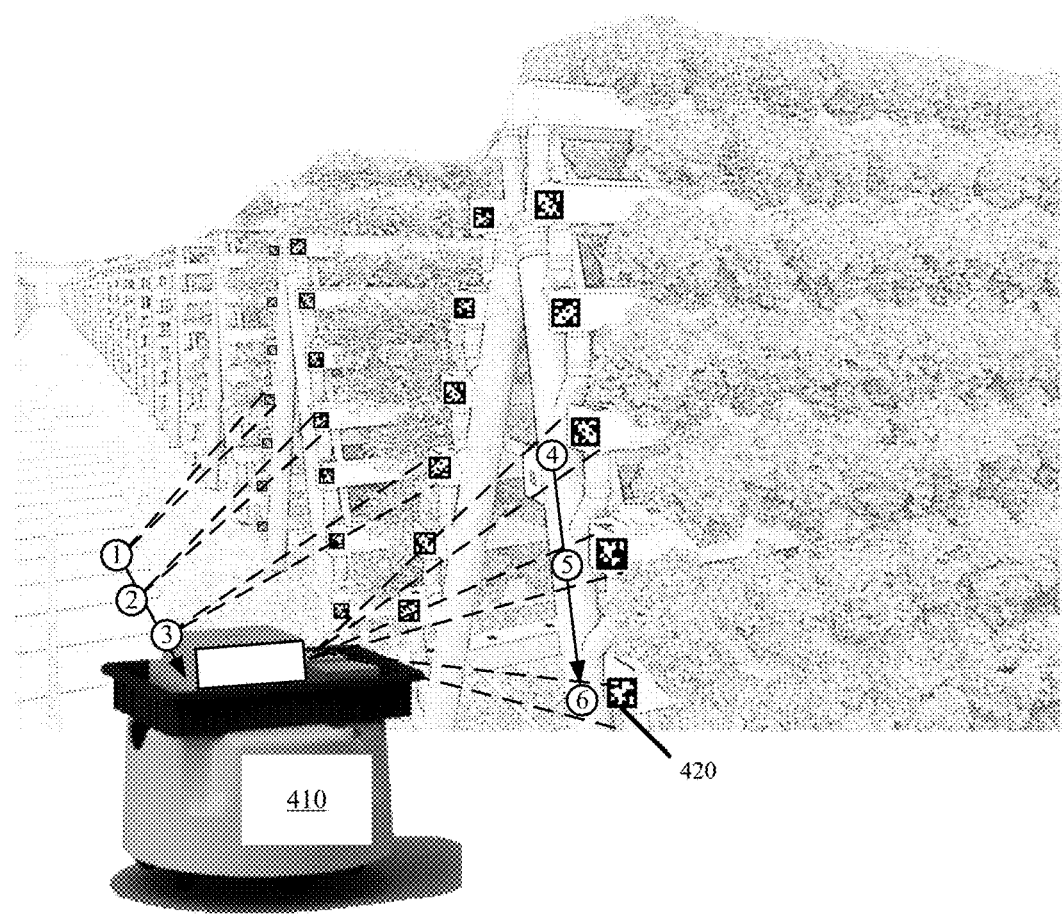
FIG. 4 conceptually illustrates a robot scanning visual identifiers in a hydroponics environment in order to determine its current location and traverse a path to a harvest location.

In some other embodiments, the path traversal occurs dynamically without such a mapping. Instead, the robot relies on its sensory array and, optionally, different visual identifiers placed about the hydroponics to determine the path to the destination. FIG. 4 conceptually illustrates a robot scanning visual identifiers in a hydroponics environment in order to determine its current location and traverse a path to a harvest location. The visual identifiers are located about the rack, shelves, and trays. Each visual identifier encodes a location as well as other information such as the organic matter that is grown at the indicated location. The robot 410 uses cameras or other sensors from its sensory array in order to scan the visual identifiers. The robot 410 decodes the scans in order to the path to the harvest location identified by visual identifier 420, wherein the visual identifier 420 can be provided to the robot as the location identifier for the particular organic matter in the instruction received at step 310 of process 300. As noted above, the location identifiers can be fiducials, barcodes, quick response codes, or other visual or signal identifiers. Global Positioning System (GPS) coordinates and other beacons can alternatively or additionally be used to guide the robot to the particular organic matter.

Returning to process 300, the process next images (at 330) or scans the vines, plants, or trees at the harvesting location. The process identifies (at 340) harvestable particular organic matter from the images or scans. In some embodiments, the robot autonomously identifies the harvestable organic matter that is ripe and sufficiently mature from other organic matter that requires additional time to grow or has spoiled. The autonomous identification is performed with the robot processing the images or scans in order to identify harvestable organic matter that satisfies a threshold coloring, size, and shape. Part of the instruction received at 310 may specify the threshold coloring, size, and shape for the particular organic matter that is to be harvested. Alternatively, the robot may be configured or programmed with the thresholds for each organic matter that the robot is configured to harvest.

Figure 5:
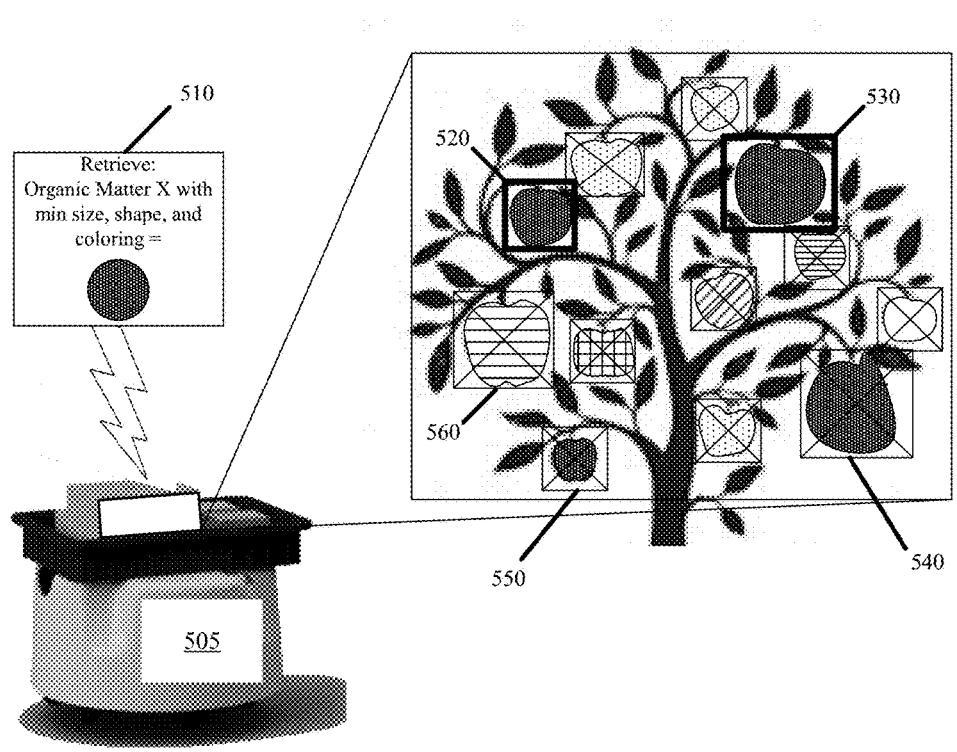
FIG. 5 conceptually illustrates a robot autonomously differentiating harvestable organic matter from other organic matter in accordance with some embodiments.

FIG. 5 conceptually illustrates a robot 505 autonomously differentiating harvestable organic matter from other organic matter in accordance with some embodiments. The robot 505 is configured with the threshold color, size, and shape 510 for the harvestable organic matter. The robot 505 uses one or more cameras or other sensors from its sensory array to image a plurality of organic matter at different growth stages growing about different branches or stems of a plant. In some embodiments, a depth camera or laser accurately determines the size and shape of the organic matter growing on the plant and a standard camera captures the organic matter coloring.

The robot 505 processes the image relative to the configured thresholds 510. From the image processing, the robot 505 identifies organic matter 520 and 530 as being mature, ripe, and ready for harvesting based on the size, shape, and coloring of the organic matter 520 and 530 satisfying the thresholds 510. The robot 505 also identifies that the other organic matter is not ready for harvesting. For instance, the shape of organic matter 540 is too deformed, the size of organic matter 550 is too small, and the coloring of organic matter 560 does not satisfy the threshold coloring.

In some embodiments, the identification of harvestable organic matter is performed semi-autonomously. In some such embodiments, the robot captures and sends the images or scans to a remote terminal. A secondary machine or human operator at the remote terminal processes the images or scans before identifying and selecting the harvestable organic matter in the image. For instance, the human operator can circle, highlight, click, or otherwise pick the harvestable organic matter appearing in the image. The secondary machine or human operator then returns the harvestable organic matter selections to the robot.

With reference back to process 300, the process also determines (at 345) an extraction point at which the robot is to harvest the identified harvestable particular organic matter. The extraction point can be defined with a distance and vector from the position of the robot at which the image or scan was taken to the identified harvestable particular organic matter. The distance and vector guide movement of the robot harvester when autonomously harvesting the identified harvestable particular organic matter. The extraction point can also be defined as spatial coordinates.

In some embodiments, the robot determines the extraction points by processing the images taken at step 330 or processing the harvestable organic matter selections from the images taken at step 330. In particular, the robot identifies the harvestable organic matter or a selection of harvestable organic matter from the image and then determines the distance and vector or spatial coordinates at which the identified organic matter is to be harvested from the robot's current position, wherein the current position corresponds to the position at which the image was taken. The robot can also leverage laser range finders, depth cameras, and other sensors to map the extraction point.

In some embodiments, the selection of the extraction point depends on the delicacy or type of the organic matter, the manner with which the organic matter grows on the vine, plant, or tree, and the harvesting means available to the robot. The extraction point is selected to minimize damage or bruising to the organic matter being harvested as well as the vine, plant, or tree from which the organic matter is extracted. For organic matter grown in a removable pod, the extraction point can be the pod or a branch or stem growing from the pod. The extraction point for soft organic matter may be the growth stem at which the robot cuts the organic matter from the vine, plant, or tree, and the extraction point for hard organic matter may be the organic matter itself whereby the robot grabs and pulls the organic matter off the vine, plant, or tree.

The process harvests (at 350) the organic matter identified at step 340 at the extraction points determined at step 345 by activating and controlling a harvester, actuators, or other harvesting means of the robot. The harvesting further involves placing (at 360) the extracted organic matter in a storage bay of the robot.

In some embodiments, the harvesting step involves separating the organic matter or some stem or branch from the vine, plant, or tree from which the organic matter grows. In some embodiments, the harvesting step involves extracting the organic matter, wherein the extraction can involve removing the entire vine, plant, or tree or the growth pod from which the vine, plant, or tree is grown. Depending on the robot's harvesting means, the separation or extraction is performed by picking, plucking, rotating off, or shearing the organic matter.

In preferred embodiments, the harvesting means are activated and under full autonomous control of the robot. In some other embodiments, the harvesting means are under semi-autonomous control of the robot. In some such embodiments, the robot cameras provide a live view of the organic matter before the robot to the remote terminal. A secondary machine or human operator at the remote terminal can then issue directions that control the harvesting means of the robot in separating the organic matter from the plant.

In response to harvesting the set quantity of the particular organic matter or the identified ripe instances, the process directs (at 370) the robot in returning the harvested organic matter to a packaging or sorting station. The robot transfers (at 380) the harvested organic matter to the packaging or sorting station or opens the storage bay to allow another robot or human worker to package or sort the delivered particular organic matter.

Some embodiments provide robots with different harvesting means to perform the fully autonomous or semi-autonomous harvesting of hydroponically grown organic matter as described above. The different harvesting means enable the robots to harvest different types of organic matter from different types of vines, plants, and trees in different hydroponics environments. Robots with different harvesting means can be deployed in the same hydroponics environment and can be used to harvest different subsets of organic matter. For instance, robots with a first set of harvesting means can be used to harvest tomatoes from a vine while robots with a different second set of harvesting means can be used to harvest lettuce.

Figure 6:
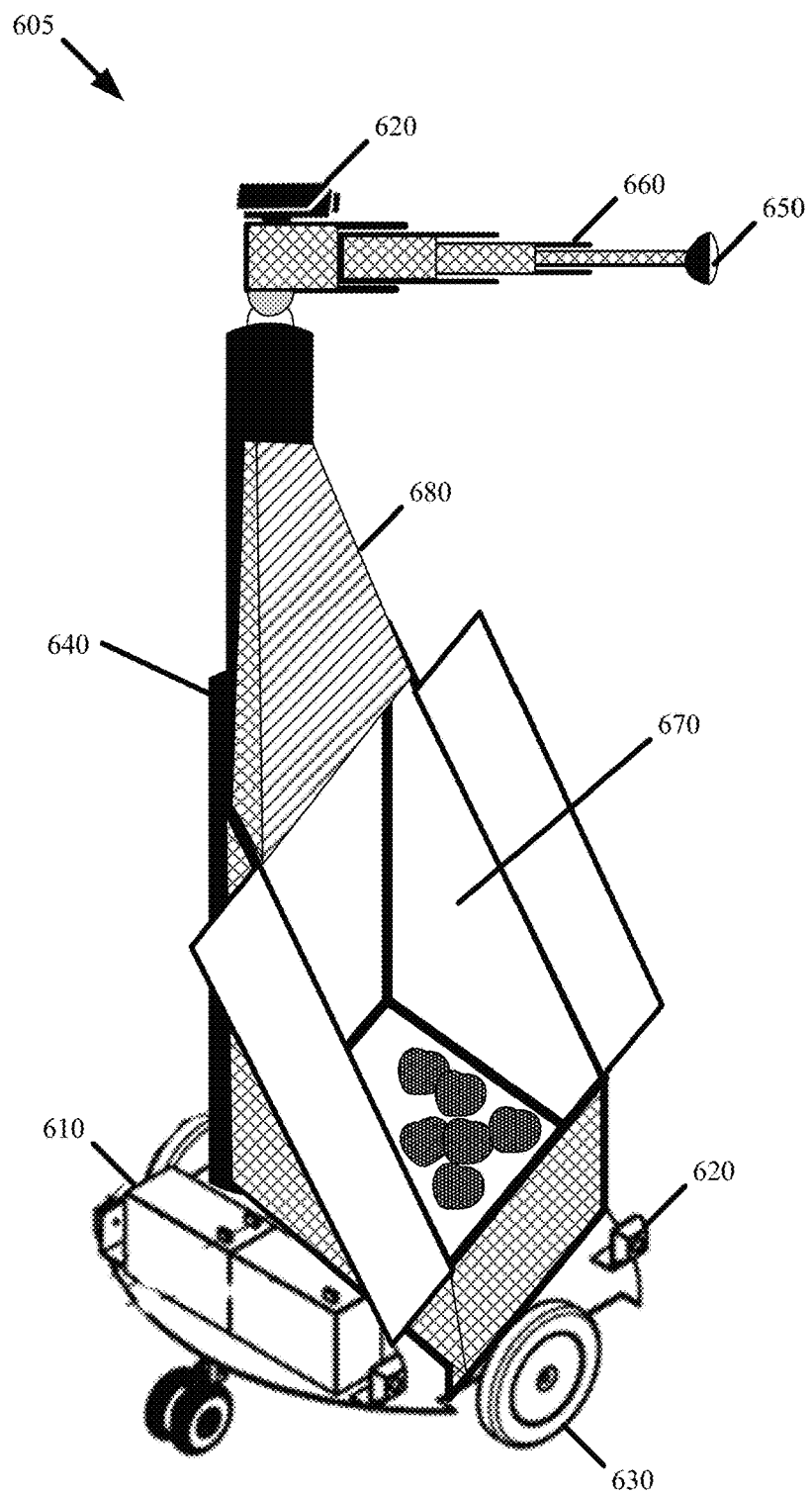
FIG. 6 illustrates a robot for autonomous harvesting of hydroponically grown organic matter in accordance with some embodiments.

FIG. 6 illustrates a robot 605 for autonomous harvesting of hydroponically grown organic matter in accordance with some embodiments. The robot 605 includes at least one power source 610, network connectivity (not shown), a set of sensors 620, at least one processor (not shown), a set of actuators 630, 640, 650, and 660, and a storage bay 670.

The power source 610 is a large capacity battery. The power source 610 powers the robot's electronic components, including the sensors 620, processor, and actuators 630-660, for several hours of continuous operation and harvesting. The power source 610 is rechargeable. The robot 605 returns to a charging station when the charge level of the power source 610 falls below a threshold level. The charging station supplies power to recharge the power source 610.

Instructions, tasks, commands, and configuration information are passed to the robot 605 using the network connectivity. Radio transceivers and receivers provide wireless network connectivity and allow remote communication with the robot 605. As noted above, the instructions can come from a remote terminal or central director that monitors and coordinates the harvesting tasks provided to one or more harvesting robots. The network connectivity also enables the semi-autonomous operation of the robot 605. For example, the robot 605 leverages the network connectivity in order to send images or scans to the remote terminal and receive selections of harvestable organic matter from the remote terminal. The remote terminal can also leverage the network connectivity in order to receive a live visual feed from the robot's sensors 620 and control the robot's actuators 630-660 during harvesting based on the live visual feed.

In some embodiments, the set of sensors 620 comprises one or more imaging cameras, depth cameras, range finders, scanners (for barcode, quick response code, etc.), light detection and ranging (Lidar) sensors, and positional detectors such as a Global Positioning System (GPS) receivers or light or sound beacon receivers as some examples. The set of sensors 620 provides sensory input to the robot 605 processor.

The processor controls and guides the robot's movements in response to different positional information collected and provided by the set of sensors 620. As noted above, the set of sensors 620 scans, images, or decodes fiducials, identifiers, or other beacon information positioned about the hydroponics environment in order to detect the robot's current position and to plot a course to a destination location. The destination location can be different trays, racks, vines, plants, or trees at which the robot 605 is to harvest organic matter. The destination location can be a packaging or sorting station to which the robot 605 delivers harvested organic matter. In some other embodiments, the set of sensors 620 maps a hydroponics arrangement or environment and the processor controls the robot's movements based on the mapping. In still some other embodiments, the set of sensors 620 provides geolocation coordinates for navigating based on some configured or generated mapping of the hydroponics arrangement or environment.

The set of sensors 620 further detects mature organic matter for harvesting once at a harvesting location as well as the irregular positions and the irregular extraction points at which the detected organic matter is to be correctly harvested. As noted with reference to FIG. 5, one or more imaging cameras, depth cameras, and other scanners from the set of sensors 620 image or scan the organic matter at the harvesting location. Image and other signal or sensor processing performed by the processor detects the maturity and ripeness of the organic matter based on the coloring, size, and shape of the organic matter in the images or scans obtained from the set of sensors 620. As part of the image processing, the robot 605 also maps the positions of the harvestable organic matter to determine the height, width, and depth from the robot's current position.

The robot 605 processor activates and controls the set of actuators 630-660 based on the sensory input from the set of sensors 620. The set of actuators include motorized wheels 630, a lift 640, and a harvester. The motorized wheels 630 move the robot 605 within a hydroponics environment. The lift 640 adjusts the vertical height of the robot 605 and, more specifically, the vertical height of the vacuum 650. The lift 640 can be a pneumatic lift or one that is operated with a motor. In the embodiments illustrated by FIG. 6, the harvester is comprised of a vacuum 650 about an extendable arm 660. As shown in FIG. 6, the extendable arm 660 is a telescoping or collapsing structure with the vacuum 650 at the distal end. In its collapsed state, the extendable arm 660 can be retained entirely within the robot 605 perimeter. In its extended state, the extendable arm 660 spans several feet from the robot 605 perimeter. The extendable arm 660 is disposed above a pivoting actuator that tilts the extendable arm 660 upwards, downwards, and around. In some embodiments, the extendable arm 660 along with the pivoting actuator is a mechanical arm that moves in three dimensional space. The vacuum 650 includes a suction cup or other pliable surface that is coupled to a suction pump.

With this configuration, the robot 605 autonomously harvests organic matter by first repositioning the robot 605. Repositioning can involve activating the motorized wheels 630 to correct robot 605 orientation or position the robot 605 a set distance from the organic matter to be harvested. Repositioning can also involve raising or lowering the lift 640 to position the extendable arm 660 about a plane of the organic matter to be harvested. After the robot's position relative to the organic matter is corrected, the extendable arm 660 and vacuum 650 are used to harvest the organic matter. The vacuum 650 creates a suction seal to engage the organic matter. Different manipulations of the extendable arm 660 then extract the organic matter. Harvesting further involves the robot 605 moving the extendable arm 660 over the storage bay 670. The robot 605 turns off the vacuum 650, thereby removing the suction seal and causing the extracted organic matter to fall into the storage bay 670. Alternatively, the robot 605 can place the extracted organic matter in the storage bay of a different second robot that is positioned alongside robot 605, wherein the second robot collects the harvested organic matter from one or more other robots, like robot 605, performing the harvesting before transferring the collected organic matter to a packaging or sorting station.

In some embodiments, a sloped surface 680 extends from below the extendable arm 660 into the storage bay. The sloped surface 680 offers a more gradual and gentle entry for the organic matter into the storage bay 670. Rather than falling the distance separating the vacuum 650 from the storage bay 670, the sloped surface 680 causes the harvested organic matter to slide or roll into the storage bay 670.

The storage bay 670 is a container for retaining the harvested organic matter. The storage bay 670 is located in the front of the robot 605. In some embodiments, an actuator is coupled to a door that opens and closes access to the storage bay 670. In some embodiments, the storage bay 670 includes refrigeration to maintain the freshness of the harvested organic matter during transport to a packaging or sorting station.

Figure 7A:
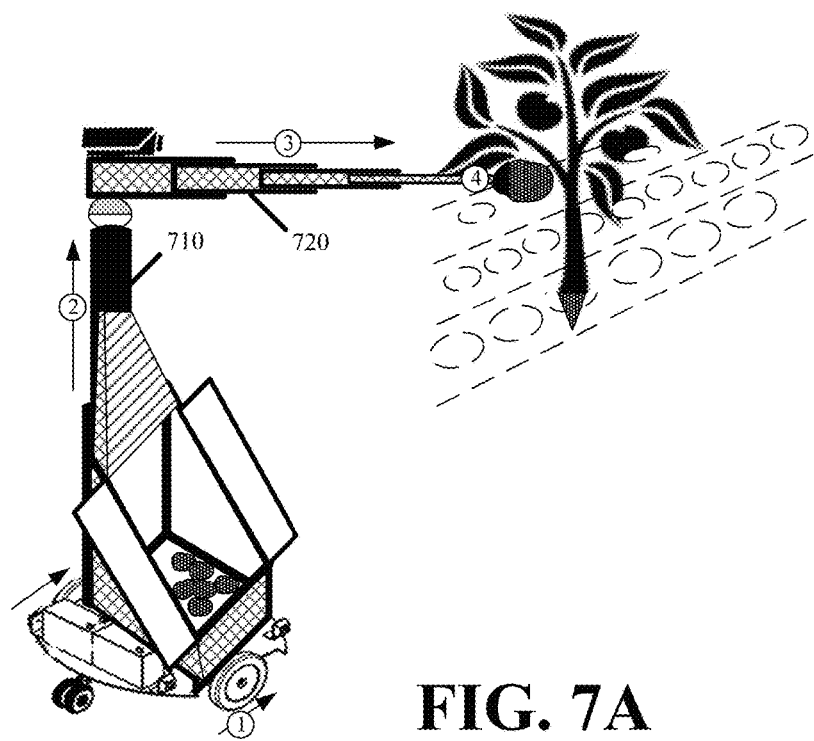
FIGS. 7A and 7B illustrate autonomous harvesting of hydroponically grown organic manner using a vacuum implemented harvester in accordance with some embodiments.
Figure 7B:
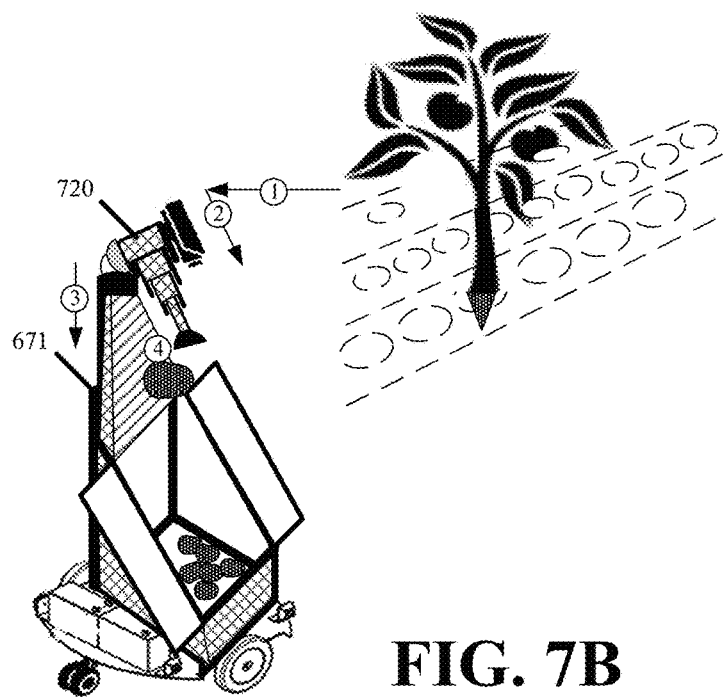

FIGS. 7A and 7B illustrate autonomous harvesting of hydroponically grown organic manner using the harvesting means of the FIG. 6 robot in accordance with some embodiments. As shown in FIG. 7A, the robot moves repositions itself before the organic matter to be harvested by powering the wheels and raising the lift 710 to position the extendable arm 720 at a height of the organic matter to be harvested. The robot then extends the extendable arm 720 towards the organic matter. Upon contact or sufficient distance from the organic matter, the robot activates the vacuum until a suction seal is made with the organic matter. FIG. 7B, then illustrates the extendable arm 720 rotating robot retracting the extendable arm 720 in order to pluck or extract the organic matter from the vine, plant, or tree from which it grew. The robot then lowers the extendable arm 720 and the lift before powering off the vacuum in order to place the extracted organic matter in the storage bay.

In some embodiments, the extendable arm 720 rotates several revolutions before retracting. The rotation aids in separating the organic matter from a growth stem of a vine, plant, or tree. The vacuum ensures that the organic matter does not fall once detached from the vine, plant, or tree.

Figure 8A:
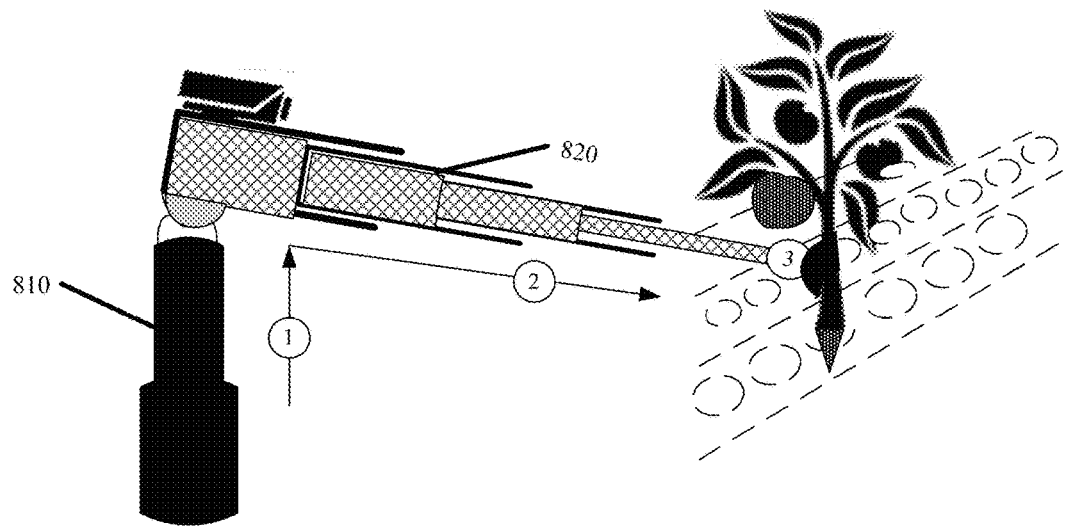
FIGS. 8A and 8B illustrate an alternative manner for autonomous harvesting of hydroponically grown organic manner using a vacuum implemented harvester in accordance with some embodiments.
Figure 8B:
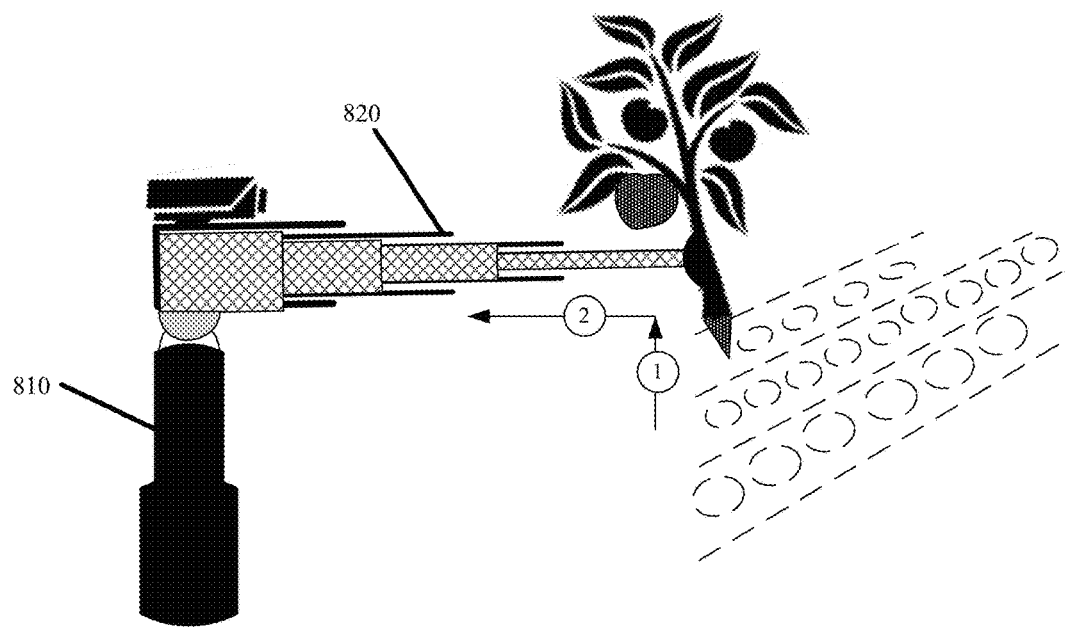

FIGS. 8A and 8B illustrate an alternative manner for autonomous harvesting of hydroponically grown organic manner using the harvesting means of the FIG. 6 robot in accordance with some embodiments. In FIG. 8A, the robot again raises the lift 810 to position the extendable arm 820 about a height of the organic matter to be harvested. However, rather than directly engage the organic matter that is to be harvested with the vacuum, the robot engages a stem or branch of the vine, plant, or tree bearing the organic matter with the vacuum. In FIG. 8B, the robot raises the extendable arm 820 while continuing to engage the plant so that the plant including the pod in which it is grown is removed from the retention point of the corresponding shelf or tray. The entire plant can then be placed in the storage bay. Harvesting in this manner is preferable when the harvestable organic matter is the entire plant, such as the case with lettuce, or when the harvestable organic manner is better picked by humans. In the latter case, the robots expedite the picking of the harvestable organic manner by bringing the plants with the organic matter to the human rather than move the human from plant to plant.

It should be noted that the extendable arm of some embodiments includes one or more joints at which the direction of the extendable arm can be altered. The joints can be located at each telescoping section of the extendable arm. Moreover, the joints can be coupled with an actuator that separately controls the extension of the section and the direction of in which the section is extended. By manipulating the joints, the extendable arm can be made to maneuver under, above, and around vines, plants, or trees in order to reach individual stems at which organic matter is to be harvested.

Figure 9:
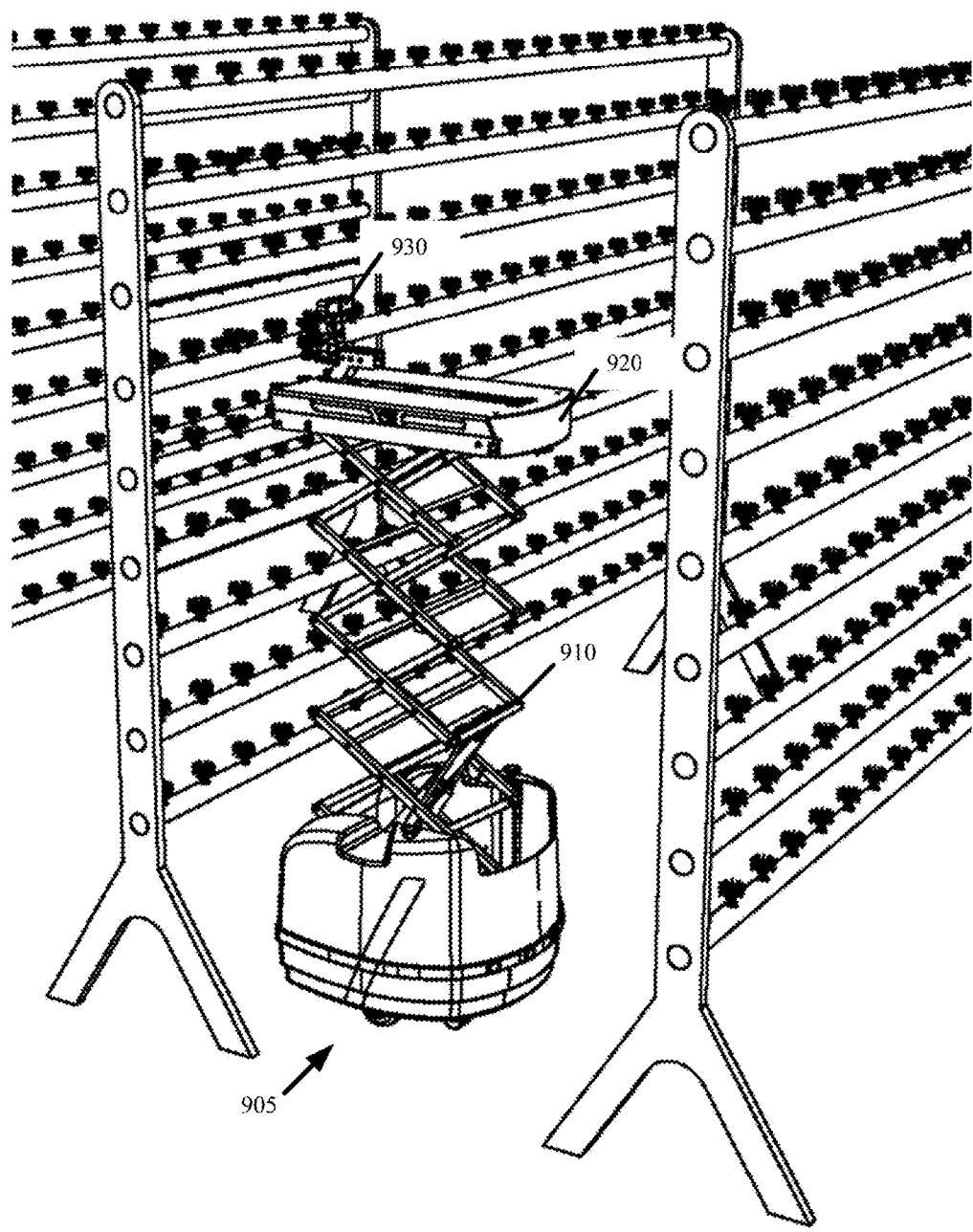
FIG. 9 conceptually illustrates an alternative implementation of a robot with a vacuum implemented harvester.

FIG. 9 conceptually illustrates an alternative implementation of a robot 905 with a vacuum implemented harvester. The robot 905 shares the motorized base, power source, processor, and network connectivity of robot 605 from FIG. 6. The robot 905 further comprises a lift 910 implemented as a folding framework. Atop the lift 910 is a platform 920 across which the vacuum 930 is moved by a motor. The vacuum 930 is moved to the front edge of the platform 920 in order to engage organic matter that is to be harvested. The vacuum 930 is then retracted to extract the organic matter. The lift 910 can be raised or lowered as in FIGS. 8A and 8B to aid in the extraction. The extracted organic matter rests atop the platform 920 or is placed on another robot for delivery to a packaging or sorting station.

Some embodiments implement the robots with different harvesters or harvesting means than what is depicted above. In particular, some embodiments modify the set of actuators comprising the harvester by substituting the vacuum with grippers. The grippers are two or more pincers with which the robot grabs the organic matter that is to be harvested. The grippers create two or more points of contact with the organic matter. In some embodiments, the grippers fully close around and encircle the organic matter. This aids in extraction when engaging a plant about the base stem and lifting the plant to extract the entire plant.

Figure 10A:
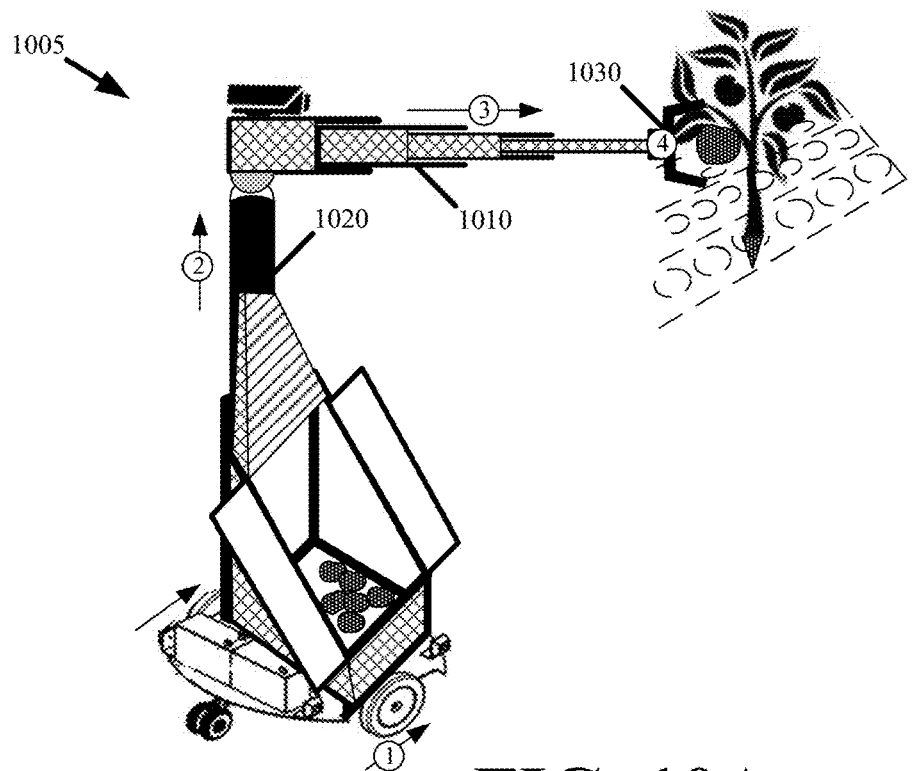
FIGS. 10A and 10B illustrate autonomous harvesting of hydroponically grown organic manner using a gripper in accordance with some embodiments.
Figure 10B:
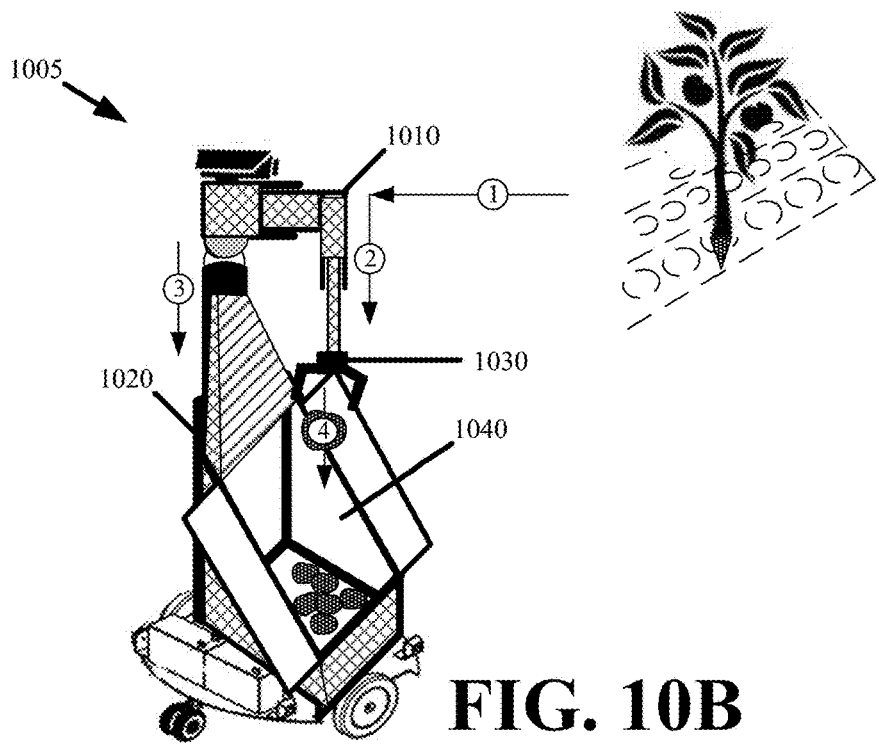

FIGS. 10A and 10B illustrates a robot 1005 configured with grippers at the distal end of the extendable arm autonomously harvesting hydroponically grown organic matter in accordance with some embodiments. Similar to FIG. 8A, FIG. 10A illustrates the robot 1005 using motorized wheels to arrive at a harvesting location and adjusting the level of the extendable arm 1010 by raising or lower the lift 1020 atop which the extendible arm 1010 is located. FIG. 10A further illustrates the robot 1005 extending the extendible arm 1010 towards the organic matter with the grippers 1030 in an open position. Once the grippers 1030 are positioned over, around, or next to the organic matter, an actuator closes the grippers 1030 on the organic matter. When picking organic matter from a vine, plant, or tree, the grippers close around the organic matter. The grippers can then rotate or tilt vertically or horizontally to aid in harvesting the organic matter. The harvesting is further aided by retracting the extendable arm 1010 towards the robot with the grippers 1030 engaging the organic matter. FIG. 10B illustrates the robot 1005 manipulating the extendable arm 1010 over the storage bay 1040, lowering the extendable lift 1020 to reduce the distance between the grippers 1030 and the storage bay 1040, and opening the grippers 1040 to place the harvested organic matter in the storage bay 1040. In some embodiments, the grippers are used to encircle or close around a stem or branch and to lift and remove the entire plant from its growth location rather than separate some organic matter from the plant.

For certain vines, plants, or trees, pulling or rotating to extract the organic matter could damage the organic matter or the vine, plant, or tree from which the organic matter is harvested. Accordingly, some embodiments provide another modified harvester.

Figure 11:
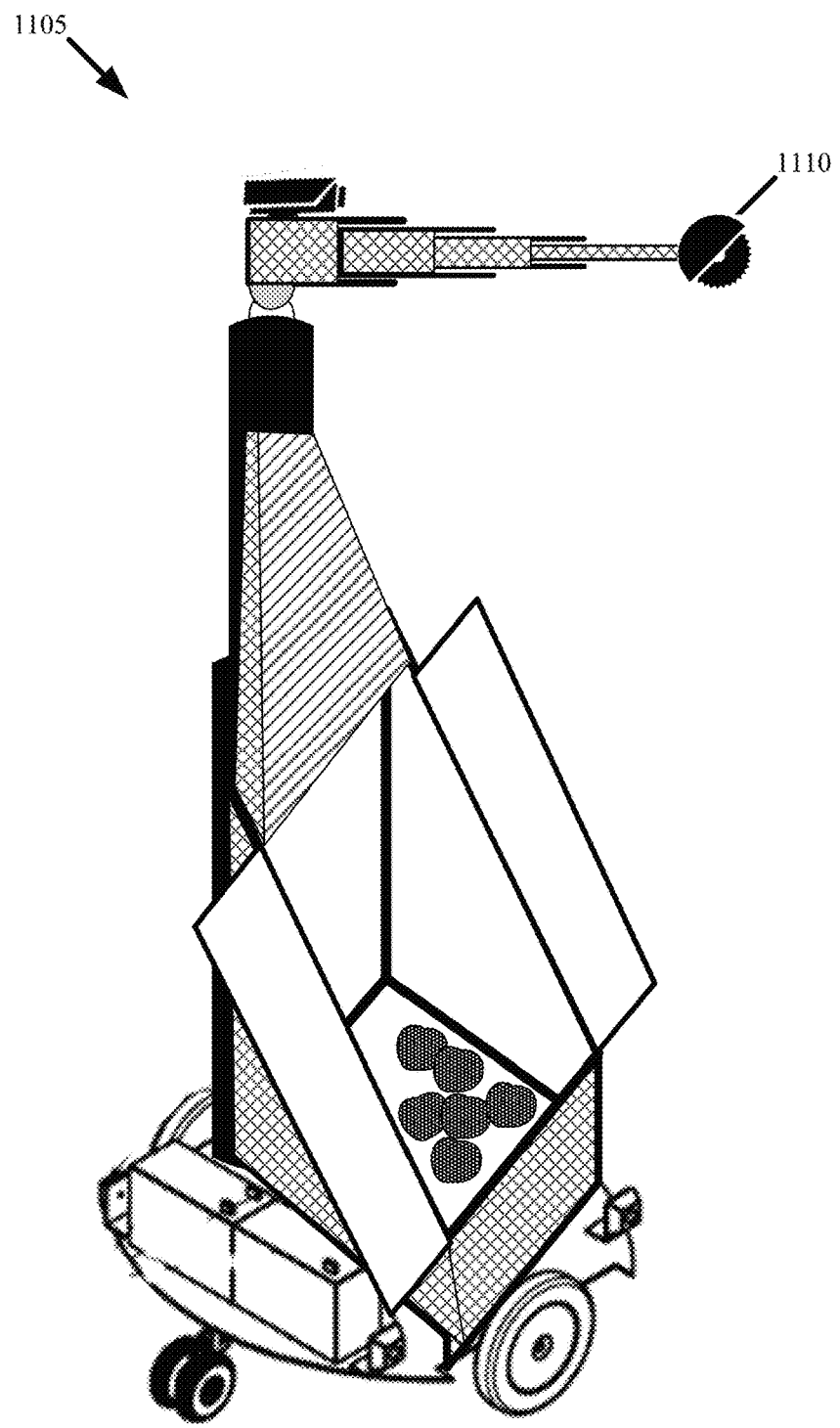
FIG. 11 illustrates a robot for autonomous harvesting of hydroponically grown organic matter with a harvester that includes a motorized cutting saw in accordance with some embodiments.

FIG. 11 illustrates a robot for autonomous harvesting of hydroponically grown organic matter with a harvester that includes a motorized cutting saw in accordance with some embodiments. As shown, the robot 1105 again includes a motorized base, a set of sensors, a lift, a storage bay, and an extendable arm. The motorized saw 1110 is located at the distal end of the extendable arm. The robot 1105 relies on the set of sensors to identify a base or stem at which to activate the motorized saw 1110 in order to safely remove the organic matter. Before cutting the organic matter, the robot 1105 positions the storage bay underneath the organic matter so that when the organic matter is cut, it falls into the storage bay.

Figure 12:
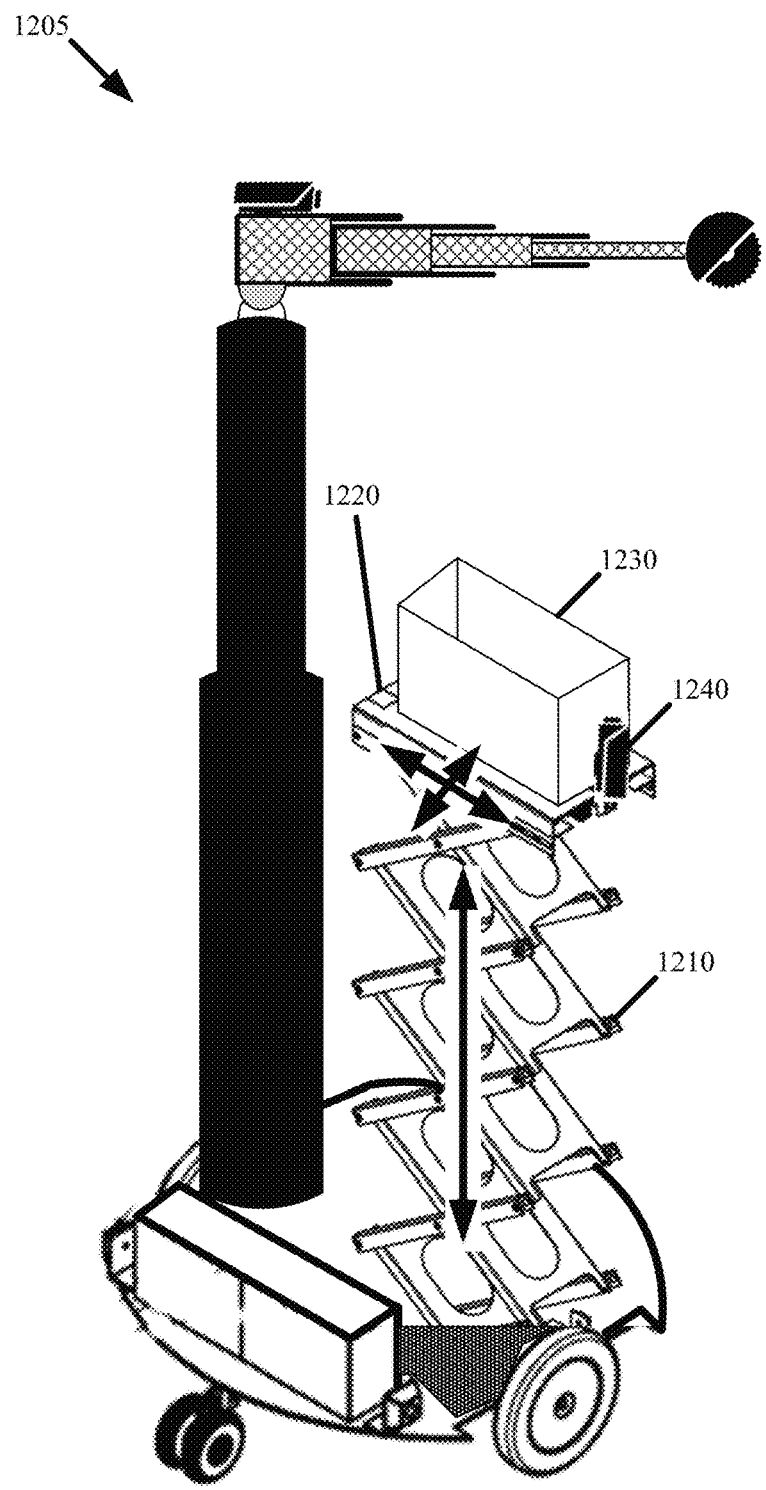
FIG. 12 illustrates a robot with a movable storage bay in accordance with some embodiments.

Some embodiments provide a movable platform underneath the storage bay for positioning the storage bay underneath the organic matter prior to activating the motorized saw. FIG. 12 illustrates a robot 1205 with a movable storage bay in accordance with some embodiments. As shown, the robot 1205 is configured with a second lift 1210. The second lift 1210 has a platform 1220 above which the storage bay 1230 is located. The second lift 1210 raises and lowers a height of the storage bay 1230. The platform 1220 contains an actuator for moving the storage bay 1230 sideways as well as forwards and backwards atop the second lift 1210. By manipulating the second lift 1210 and the platform 1220, the robot 1205 can minimize the distance separating the storage bay 1230 from the organic matter that is cut using the motorized cutting saw. In some embodiments, a camera or other sensor 1240 is positioned about the platform 1220 or storage bay 1230 to assist in aligning the storage bay 1230 with the organic matter that is to be cut.

Some embodiments provide an extendable arm that includes both the motorized cutting saw with the vacuum of FIG. 6 or the gripper of FIGS. 10A and 10B. In some such embodiments, the robot uses the vacuum or gripper to couple to the organic matter to be harvested. The robot then relies on the set of sensors to identify a base or stem at which to activate the motorized cutting saw in order to safely remove the organic matter. Once the organic matter is cut from the vine, plant, or tree, the vacuum or gripper can gently deposit the organic matter into the storage bay.

Some embodiments substitute clipping shears in place of the motorized cutting saw at the distal end of the extendable arm. The clipping shears include one or more sharp or serrated edges for cutting or pruning organic matter from vines, plants, or trees harvested by the robot. An actuator opens and closes the clipping shears. In some such embodiments, the robot positions the clipping shears over a stem or base of the organic matter by manipulating the extendable arm. The positioning can further involve repositioning the robot base by activating the motorized wheels and by raising or lowering the lift to adjust the height of the clipping shears. The robot activates the clipping shears to cut the organic matter from the vine, plant, or tree. The cut organic matter falls into the robot's storage bay.

Figure 13:
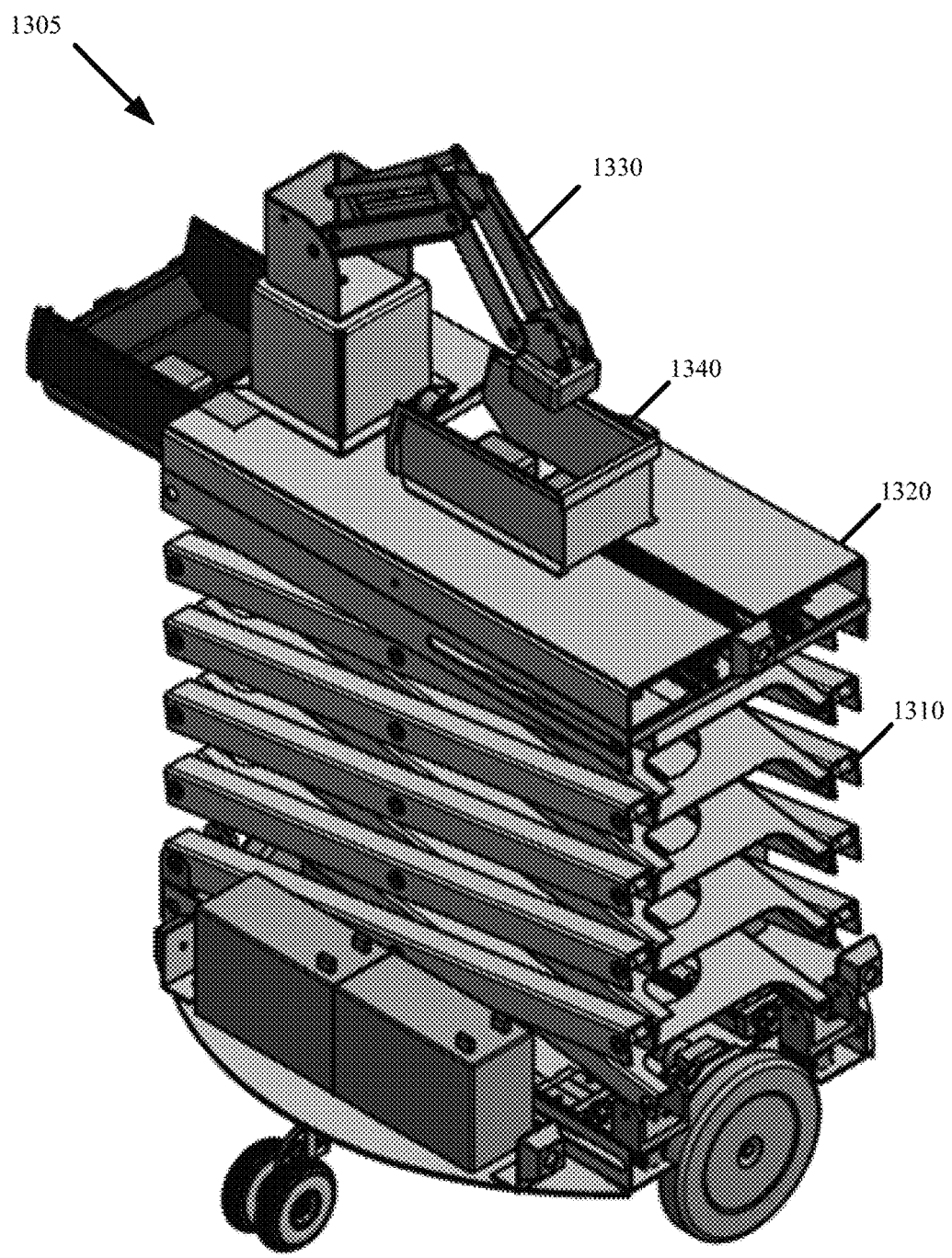
FIG. 13 illustrates an alternative implementation of the harvesting robot with a movable storage container in accordance with some embodiments.

FIG. 13 illustrates an alternative implementation of the harvesting robot with a movable storage container in accordance with some embodiments. As shown, the robot 1305 includes a single lift 1310. A platform 1320 is positioned atop the lift 1310. The platform 1320 includes a mechanical arm 1330 with a harvester and a movable storage container 1340. The mechanical arm 1330 rotates around the platform 1320 and lifts or lowers to align with organic matter that is to be harvested. A vacuum with a suction cup is disposed about the distal end of the mechanical arm 1330, although the vacuum can be replaced with the gripper, cutting saw, or clipping shears described above. An actuator controls movement of the storage container 1340 across the platform 1320. The actuator can move the storage container forward, backward, or sideways about the platform. Sensors located on the platform 1320 and/or the mechanical arm 1330 guide the actuator in positioning the storage container 1340 under the organic matter that is to be harvested or under the harvester at the distal end of the mechanical arm 1330. In some embodiments, the actuator couples to the storage container with a set of nubs or protrusions. This allows for easy interchanging of the storage container 1340. For example, the robot 1305 can deliver a full storage container 1340 to a packaging or storage station. A human or other robot at the station removes the full storage container and inserts an empty storage container in its place so that the robot 1305 may resume the harvesting operations.

Robot locomotion thus far has been described with motorized wheels. The actuators providing robot locomotion can be changed without changing the manner by which the various robots harvest organic matter. Some embodiments replace the motorized wheels with a pair of motorized tracks that can be controlled independent of one another. Some other embodiments replace the motorized wheels with motorized propellers. The propellers enable aerial locomotion and allow the robots to navigate in hydroponics environments that are densely packed as well as to reach trays or racks that are positioned away from navigable paths on the ground.

In any case, the actuators adapt the robots for movement in any environment in which humans can also perform extraction as well as in other environments that are too dense for humans. The actuators also extend the robots' reach both vertically and horizontally beyond human reach.

In addition to the autonomous harvesting described above, the robots set forth herein can also autonomously monitor the health of the hydroponically grown organic matter. The health monitoring is implemented using the robots' set of sensors. A robot can position itself in the same locations at different times (e.g., days) and take images of the organic matter. The robot compares current images with previous images taken from the same location for deviations. Deviations between the images will reveal growth rates and health of the organic matter. Growth rates can be computed based on deviations in organic matter size in two different images. Health can also be computed based on deviations in organic matter size in two different images. In particular, the robot can determine health based on whether a plant is growing at an expected rate as well as the size of blooms or organic matter yield. The robot can also determine health without reference to prior images. In particular, the robot can determine health based on the organic matter coloring. Other aspects of an image from which the robot autonomously ascertains health include detection of insects or other unexpected organisms (e.g., fungus, mold, etc.).

In response to the monitoring, the robot can adjust nutrient levels, lighting, temperature, and other factors affecting growth. In some embodiments, the robot wirelessly or physically modifies lighting and temperature controls. In some embodiments, the robot deposits nutrient rich liquids or nutrient tablets that dissolve in water in or around plants in need of additional nutrients. The robot can also trigger changes in lighting and temperature by communicating the health monitoring results to a central controller. The robot can also submit the images to the central controller for storage or for analysis. For instance, images that the robot passes to the central controller can be inspected by a human that then directs the robot to deposit additional nutrients or that adjusts lighting and temperature as needed. The human can also initiate harvesting based on the received images by selecting the organic matter that the robot is to harvest.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A robot comprising:
    a motorized base;
    an expandable and collapsible lift mounted atop and at a back of the motorized base, the lift vertically raising and lowering to a plurality of heights;
    a pivoting first actuator connected to a top of the lift;
    an extendable second actuator with a proximal end directly connected to the pivoting actuator, and a distal end that extends out from the proximal end, wherein the extendable second actuator rotates above the lift by operation of the pivoting first actuator;
    a harvesting third actuator connected at the distal end of the extendable second actuator;
    a storage bay mounted atop and at a front of the motorized base, the storage bay comprising a container with walls rising from the motorized base in front of said lift to a first height, the storage bay further comprising a sloped solid surface that is connected to a wall closest to the lift at the first height, and that extends from the first height at an angle towards the lift to a greater second height that is below the harvesting third actuator; and
    a processor controlling said lift to adjust the harvesting third actuator to a particular height aligned with at least one item of harvestable organic matter from a plurality of organic matter growing on a vine, plant, or tree, and further controlling one or more of the lift, the pivoting first actuator, the extendable second actuator, and the harvesting third actuator in separating the at least one item of harvestable organic matter from the vine, plant, or tree and depositing the at least one item of harvestable organic matter into the storage bay after said separating.

2. The robot of claim 1 further comprising a set of sensors imaging or scanning a plurality of organic matter growing on the vine, plant, or tree.

3. The robot of claim 2, wherein the processor further differentiates a first set of harvestable organic matter and a different second set of organic matter that is not harvestable from the plurality of organic matter based on said imaging or scanning from the set of sensors.

4. The robot of claim 1, wherein the motorized base comprises wheels, at least a first motor driving the wheels, and batteries powering said first motor, wherein the processor further controls the first motor in moving the robot across a plurality of racks from which a plurality of vines, plants, or trees are grown.

5. The robot of claim 1, wherein the harvesting third actuator comprises a mechanical arm.

6. The robot of claim 1, wherein the harvesting third actuator comprises mechanical clipping shears coupled at the distal end of the extendable second actuator.

7. The robot of claim 6, wherein the extendable second actuator extracts the at least one item of harvestable organic matter by (i) positioning the clipping shears adjacent to the at least one item of harvestable organic matter with activation of the extendable second actuator and (ii) cutting the at least one item of harvestable organic matter from the vine, plant, or tree as a result of activating the mechanical clipping shears in a manner so that the at least one item of harvestable organic matter falls into the storage bay.

8. A robot comprising:
a motorized base;
a set of sensors generating at least a first set of sensory input from imaging or scanning visual identifiers distributed about a site and a second set of sensory input from imaging or scanning a plurality of edible organic matter growing at a particular rack of a plurality of racks in said site;
a lift extending vertically above the motorized base from a back of the motorized base;
a pivoting first actuator connected to a top of the lift;
an extendable second actuator with a proximal end directly connected to the pivoting first actuator, and a distal end that extends out from the proximal end, wherein the extendable second actuator rotates above the lift by operation of the pivoting first actuator;
an organic matter harvester connected at the distal end of the extendable second actuator;
a storage bay mounted atop and at a front of the motorized base, the storage bay comprising a container with walls rising at an angle to a first height from the front of the motorized base towards said lift, the storage bay further comprising a sloped solid surface that extends at the angle from the first height to a greater second height below the organic matter harvester; and
a processor communicably coupled to the motorized base, the set of sensors, the pivoting first actuator, the extendable second actuator, and the organic matter harvester,
wherein the processor controls the motorized base in moving said robot to the particular rack based on the first set of sensory input; and
wherein the processor further controls the first pivoting actuator, the extendable second actuator, and the organic matter harvester in:
moving to an extraction point for edible organic matter at the particular rack that is identified from the second set of sensory input,
engaging the edible organic matter that is attached to a plant, tree, or vine at the extraction point with the organic matter harvester based in part on a first set of adjustments to one or more of a height of the lift, a length of the extendable second actuator, and rotation of the extendable arm by the pivoting first actuator,
separating the edible organic matter from the extraction point while continuing to engage the edible organic matter with the organic matter harvester,
releasing the edible organic matter over the sloped solid surface of storage bay based in part on a different second set of adjustments to one or more of the height of the lift, the length of the extendable second actuator, and the rotation of the extendable arm by the pivoting first actuator.

9. The robot of claim 8, wherein the processor determines the extraction point based in part on detecting from the second set of sensory input, the edible organic matter matching a threshold size, shape, and coloring and other edible organic matter from the plurality of edible organic matter not matching at least one of the threshold size, shape, and coloring.

10. The robot of claim 8, wherein the set of sensors comprises one or more of an imaging camera, a depth camera, a scanner, and a range finder.

11. The robot of claim 8, wherein the storage bay comprises motorized doors opening prior to said releasing and closing after the edible organic matter transfer from the sloped solid surface into the storage bay.

* * * * *